Aug. 16, 1932.   P. L. PRINS   1,871,735
SIX-WHEEL MOTOR CHASSIS
Filed Nov. 6, 1930   2 Sheets-Sheet 1

Inventor
Peter Lourens Prins
per
Attorney

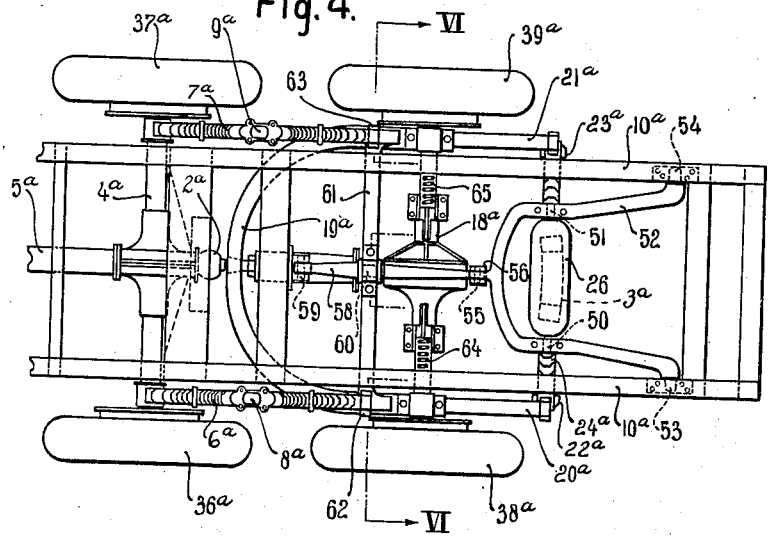
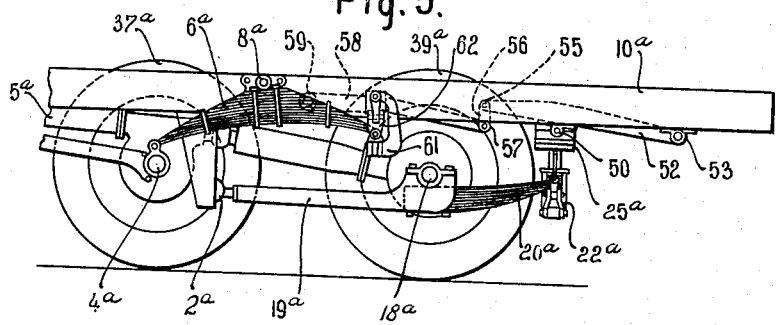
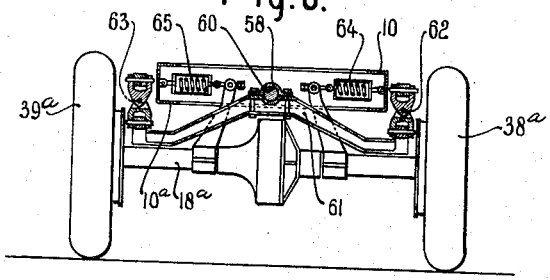

Patented Aug. 16, 1932

1,871,735

UNITED STATES PATENT OFFICE

PETER LOURENS PRINS, OF AMSTERDAM, NETHERLANDS

SIX-WHEEL MOTOR CHASSIS

Application filed November 6, 1930, Serial No. 493,827, and in Germany November 7, 1929.

My present invention relates to six wheel motor chassis, the two rear axles of which have a relatively small interdistance and of which the rearward axle is mounted in a frame having a universal joint with the chassis frame, reference being had to my copending application for patent Serial No. 301,325, filed August 22nd, 1928. The object of my invention is to more evenly distribute the load over the wheels, to avoid deflection of the chassis frame and to minimize the bumping of the suspension springs, which is inherent to many known types of six wheel chassis.
With these and other objects in view I suggest to secure either end of the intermediate axle to one end of a longitudinal spring hinged to the chassis frame and to pivotally connect the other end of said spring, through a suitable lever system to a transverse carrier.

Figure 1:
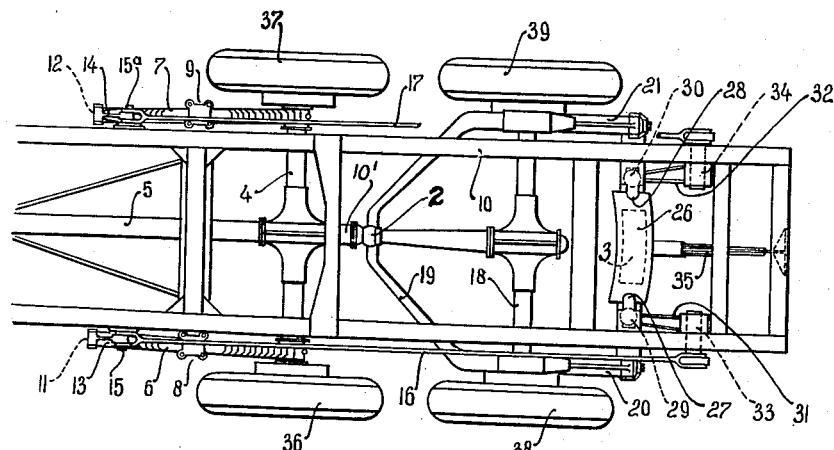
Figure 2:
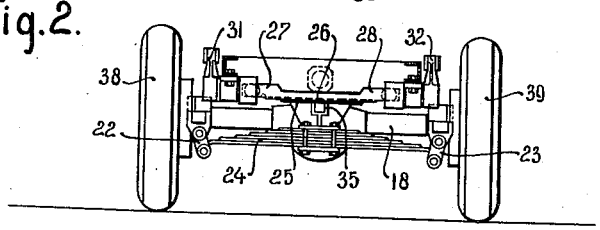
Figure 3:
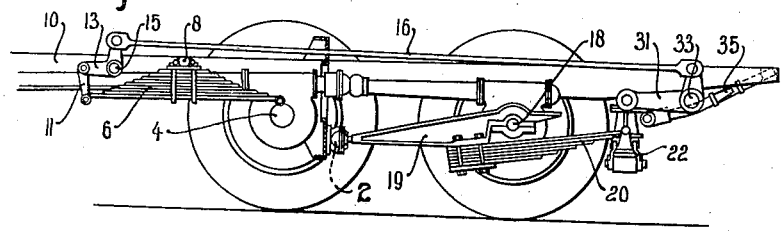

In order that my invention may be fully understood, I shall now proceed to describe in detail two embodiments thereof with reference to the annexed drawings, on which Fig. 1 is a plan view,
 Fig. 2 is a rear elevation and
 Fig. 3 is a side elevation of part of the first embodiment, whereas:
 Fig. 4 is a plan view of a second embodiment,
 Fig. 5 is a side view of the same, and
 Fig. 6 is a cross-sectional elevation along the line VI—VI in Fig. 4 of the second embodiment shown in Figs. 4 and 5.
The intermediate axle of the chassis illustrated in Figs. 1–3 is indicated by 4. This axle is driven by the motor (not shown) through a shaft 5 and its ends are connected to the rear ends of two longitudinal suspension springs 6, 7 hinged as at 8 and 9 to the chassis frame 10. The front ends of said suspension springs are connected, through shackle links 11 and 12, to substantially horizontal arms of bell-crank levers 13 and 14, which are hinged to the chassis frame as at 15 and 15ª, the upright arms of said levers being pivoted to the front ends of coupling members 16, 17. In the example shown, each of said members is constituted by one single length of rod, but in some instances it may be composed of two aligned rods interconnected by a resilient element, such as a helical spring.

The rearward axle 18, which in the example given is also driven by the motor, although this is not necessary for the purposes of my present invention, is mounted in a frame 19 connected to the chassis frame 10 at 10' through a universal joint 2. Rigidly secured to the frame 19 are two suspension springs 20, 21, the rear ends of which are connected, through shackle links 22, 23, to the ends of a transverse spring 24. The latter is secured to a slide 25 adapted to move in an arcuate guideway 3 of a carrier plate 26. Said plate is provided on either side with trunnions 27, 28 having universal joints 29, 30 with the substantially horizontal arms of bell-crank levers 31, 32. The levers 31, 32 are pivoted to the chassis frame 10 as at 33, 34, their upright arms engaging the rear ends of the coupling members 16, 17.

Secured to the slide 25 is one end of a readjusting spring 35, the other end of which engages the chassis frame 10. Said spring 35 normally holds the slide 25 in its central position relative to the frame 10.

It will be understood that with the described construction the wheels 36, 37, 38 and 39 always take up substantially equal portions of the load, irrespective of the position of the vehicle. If the left hand side wheel 36 of the intermediate axle 4 moves upward, the shackle link 11 exerts a forward pull on rod 16, whereby the left hand end of the transverse spring 24 and, consequently, the left hand side wheel 38 of the axle 18 is forced downward, whereas the right hand side wheel 39 of the axle 18 is forced up and vice versa. Moreover, the hinged connection between frames 10 and 19 equalizes to a certain extent the wheel pressures on the left and on the right hand side.

In the embodiment illustrated in Figs. 4–6 in which the parts corresponding to those in Figs. 1–3 have been designated with the same numerals, to which, however, the character "a" has been added, the ends of the transverse carrier 26ª have pivotal connections 50, 51 with a frame 52 pivoted to the chassis frame 10 as at 53, 54 and adapted for vertical swinging motion relative to the chassis frame. Said carrier 26ª engages the transverse spring 24ª through a slide 25ª adapted for sliding movement in an arcuate guide of the carrier 26ª, whereas the ends of the transverse spring 24ª are connected through shackle links 22ª, 23ª, to the rear ends of the suspension springs 20ª, 21ª, which, in turn, are secured to the frame 19ª, having a universal joint 2ª with the chassis frame 10ª, all as described with reference to Figs 1–3.

The central portion of frame 52 is pivoted, as at 55, to one end of a short link 56, the other end of which is hinged, as at 57, to the rear end of a longitudinal lever 58, the front end of which is pivoted as at 59 to the chassis frame 10ª as to be adapted for vertical swinging motion relative thereto. Intermediate between its ends, the lever 58 has a cylindrical portion 60 forming a trunnion, about which a transverse beam 61 is adapted to swing in a vertical plane. This beam 61 has upturned ends connected, through shackle links 62, 63, to the rear ends of the longitudinal suspension springs 6ª, 7ª, of the intermediate axle 4ª, said springs being pivoted to the chassis frame 10ª as at 8ª and 9ª.

It will readily be understood that the construction illustrated in Figs 4–6 operates in substantially the same manner as the one shown in Figs. 1–3, from which it is distinguished mainly by that the movements of the springs 6ª, 7ª are transmitted to the transverse carrier 26 by a lever system located in the central plane of the chassis, instead of by two lever systems arranged on either side thereof.

On the other hand, the chassis in accordance with Figs. 4–6 has two coiled springs 64 and 65, instead of one central blade spring 35 shown in Figs. 1–3, for normally holding frame 19ª in its central position.

What I claim is:

1. In a six wheel motor car the combination with a chassis frame having two rear axles spaced a relatively small distance apart and a lever system, of a secondary frame associated with the rearward axle, a universal joint connecting the same with the chassis frame, longitudinal suspension springs pivoted between their ends to the chassis frame, means connecting one end of each of said suspension springs with the intermediate axle, means connecting the other end of each of said suspension springs with said lever system, a transverse carrier flexibly associated with the said secondary frame whereby to flexibly support said chassis frame, and means connecting said lever system with said transverse carrier.

2. In a six wheel motor car the combination with a chassis frame having two rear axles spaced a relatively small distance apart and a lever system, of a secondary frame associated with the rearward axle, a universal joint connecting the same with the chassis frame, longitudinal suspension springs pivoted between their ends to the chassis frame, means connecting one end of each of said suspension springs with the intermediate axle, means connecting the other end of each of said suspension springs with said lever system, a transverse carrier associated with the said secondary frame, a transverse spring associated with said transverse carrier, whereby to flexibly support said chassis frame, longitudinal suspension springs associated with the rearward axle and secured to said secondary frame, means connecting the ends of said transverse spring with the ends of the last said suspension springs, and means connecting said lever system with said transverse carrier.

3. In a six wheel motor car the combination with a chassis frame having two rear axles spaced a relatively small distance apart and a lever system, of a secondary frame associated with the rearward axle, a universal joint connecting the same with the chassis frame, longitudinal suspension springs pivoted between their ends to the chassis frame, means connecting one end of each of said suspension springs with the intermediate axle, means connecting the other end of each of said suspension springs with the said lever system, a transverse carrier associated with the secondary frame, a transverse spring associated with said transverse carrier, whereby to flexibly support the chassis frame, means providing for movement of said transverse spring in transverse direction relative to said transverse carrier, longitudinal suspension springs associated with the rearward axle and secured to the said secondary frame, means connecting the ends of said transverse spring with the ends of the last said suspension springs, and means connecting said lever system with said transverse carrier.

In testimony whereof I affix my signature.

PETER LOURENS PRINS.